C. H. PERRY.
SPRINKLER HEAD.
APPLICATION FILED AUG. 1, 1916.
1,239,952.
Patented Sept. 11, 1917.
3 SHEETS—SHEET 1.
Fig. 1.
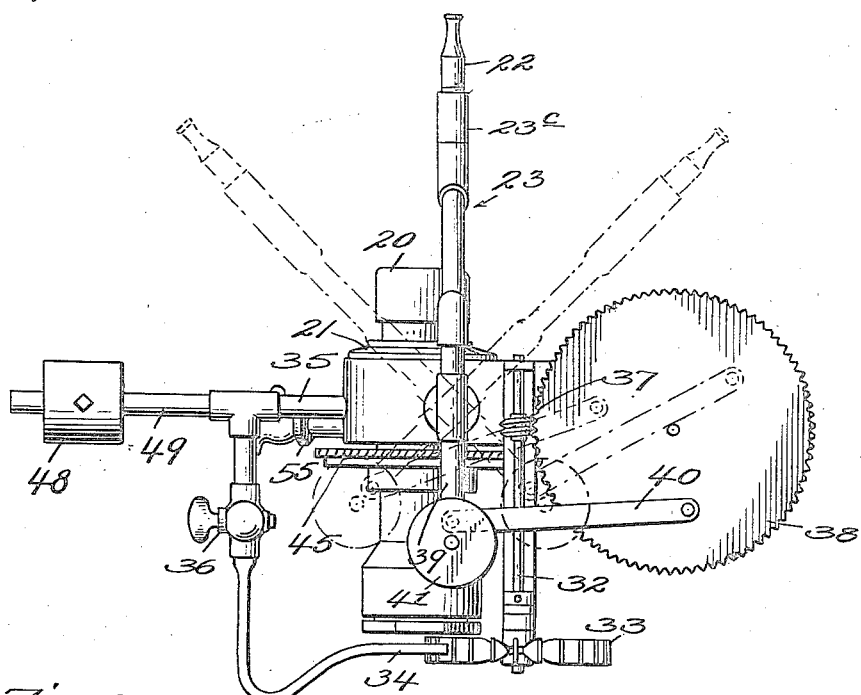
Fig. 6.
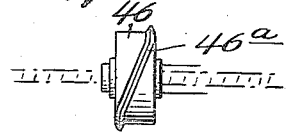
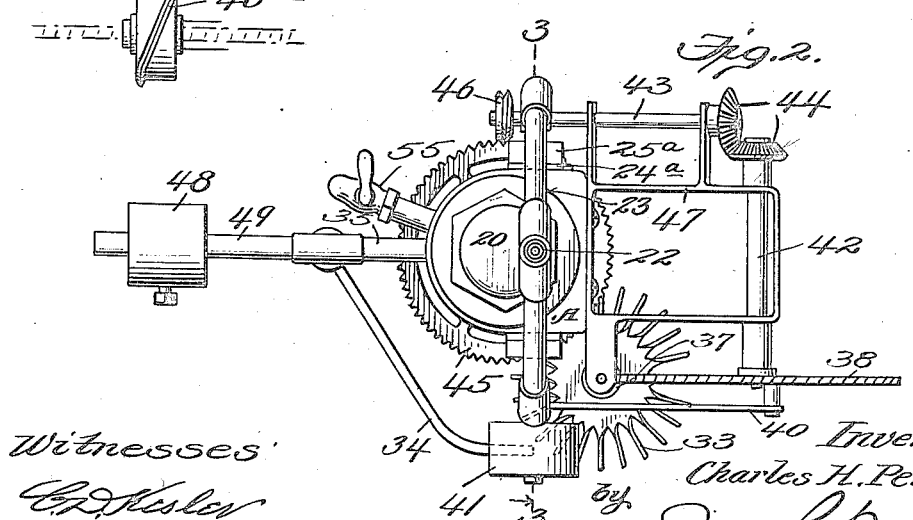
Fig. 2.
Witnesses
C. L. Kesler
John S. Powers
Inventor
Charles H. Perry
by Amos L. Norris,
Attorney

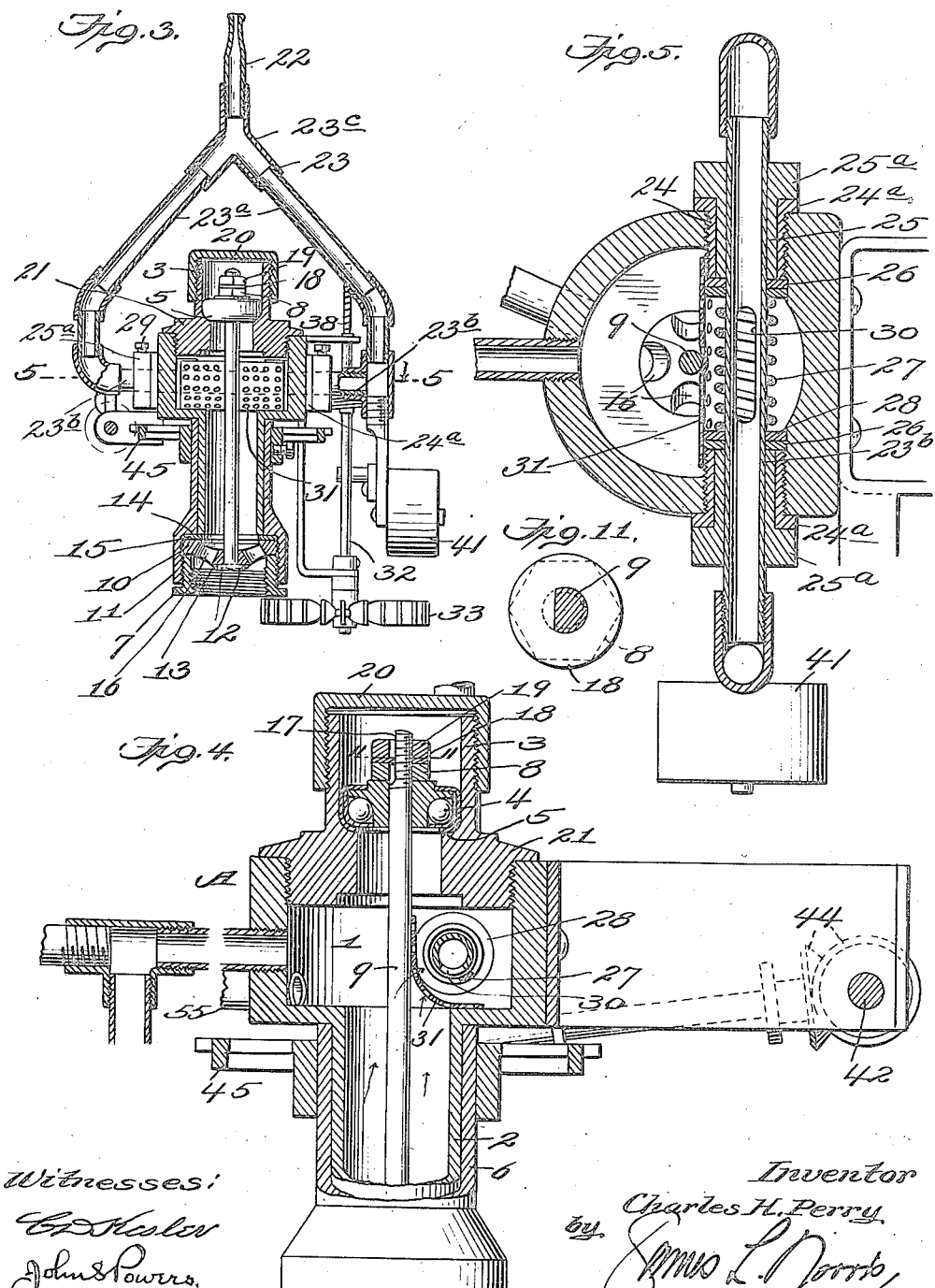

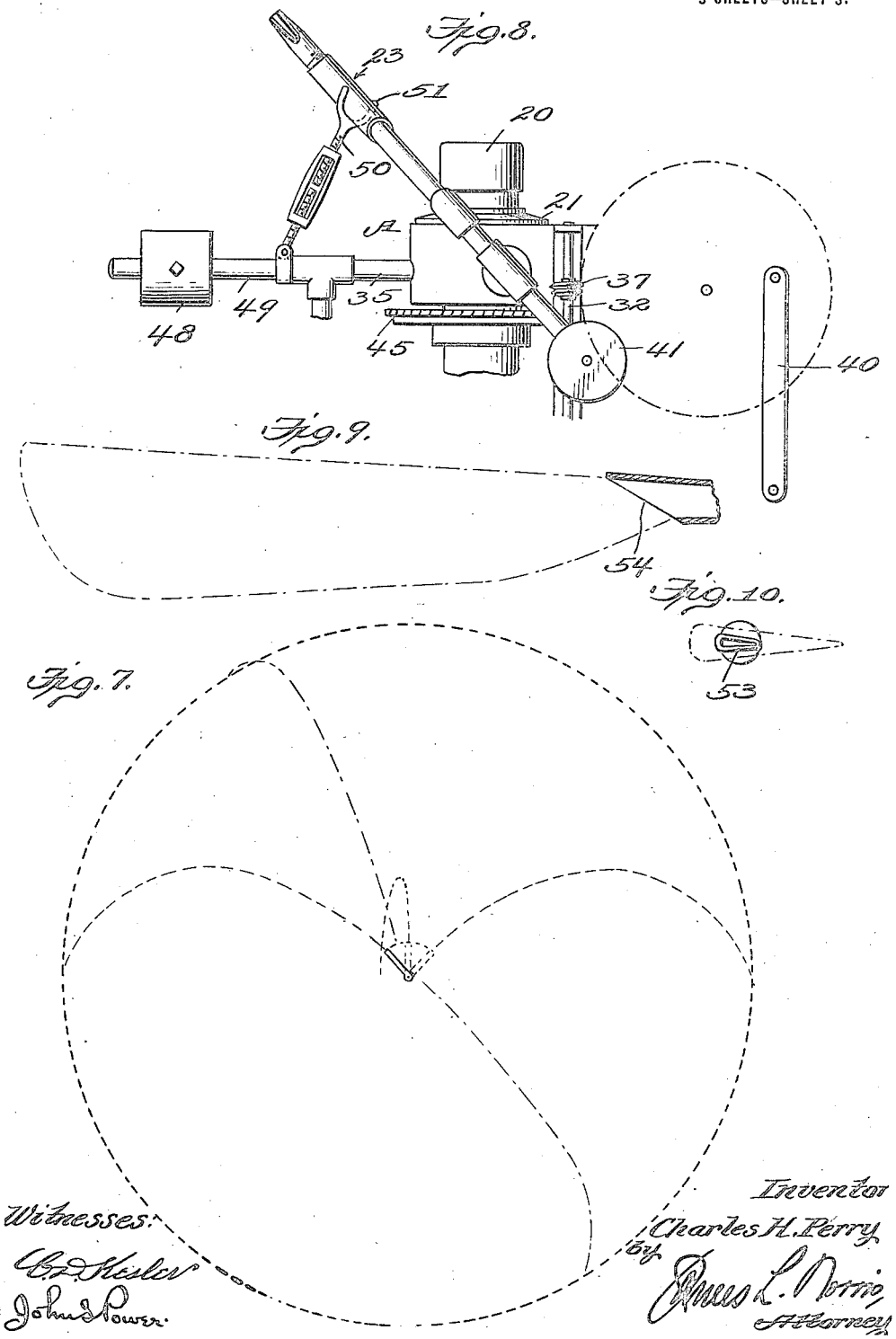

UNITED STATES PATENT OFFICE.

CHARLES H. PERRY, OF MIAMI, FLORIDA.

SPRINKLER-HEAD.

1,239,952.　　　　Specification of Letters Patent.　　Patented Sept. 11, 1917.

Application filed August 1, 1916. Serial No. 112,565.

*To all whom it may concern:*

Be it known that I, CHARLES H. PERRY, a citizen of the United States, residing at Miami, in the county of Dade and State of Florida, have invented new and useful Improvements in Sprinkler-Heads, of which the following is a specification.

This invention relates to improvements in sprinkler heads for use more particularly in irrigating operations wherein relatively large tracts of land are to be irrigated from time to time to promote the growth of agricultural products.

The principal objects of the invention are to provide an irrigating sprinkler head which shall be capable of irrigating a maximum area; which shall deliver a stream of such character that the waste of water, due to evaporation and the pressure required for the operation, shall be reduced to a minimum; which shall deliver the water in progressively greater quantities as the areas upon which the water falls are greater in distance from the center of the irrigated area, *i. e.* from the point at which the sprinkler head is located; which shall require comparatively low water pressure for its operation; which shall be readily adaptable either for out-door use, as in irrigating groves, orchards, large gardens or golf links, or for in-door use, as in sheds for growing ferns or other plants, or in large hot-houses; and which withal shall be of comparatively simple structural nature and shall embody no parts that are liable to derangement as an incident of ordinary use.

The invention consists in certain novel features of structure, combination and relation which, together with the above and other objects and advantages, will appear as the description proceeds.

What is now considered as a preferred embodiment of the invention is shown in the accompanying drawing, wherein:—

Figure 1 is a side elevation of a sprinkler head in which the features of the invention are incorporated;

Fig. 2 is a top plan view thereof;

Fig. 3 is a cross-sectional view thereof on the line 3—3 of Fig. 2;

Fig. 4 is a central longitudinal sectional view on a somewhat enlarged scale;

Fig. 5 is a horizontal sectional view on a somewhat enlarged scale on the line 5—5 of Fig. 3;

Fig. 6 is a detail elevation of an element hereinafter termed a cam worm;

Fig. 7 is a diagram illustrative of the operation of the sprinkler;

Fig. 8 is an elevation illustrating the sprinkler adapted for in-door use;

Figs. 9 and 10 are, respectively, a detail longitudinal section and an end elevation of a special form of nozzle employed in the adaptation shown in Fig. 8;

Fig. 11 is a detail sectional view on the line 11—11 of Fig. 4.

Similar characters of reference designate corresponding parts throughout the several views.

In the construction of the present sprinkler head a number of the salient features of the sprinkler head shown in my patent No. 1,165,202, granted December 21, 1915, may advantageously be employed. Thus, the present sprinkler head comprises a hollow rotating body A which is formed with an enlarged water distributing chamber 1, with a hollow cylindrical journal 2 projecting from the lower end of said chamber and with an extension 3 projecting from the upper end of said chamber. The journal 2 fits within a stationary sleeve 6 which at its lower end carries a nut 7 or equivalent device for connecting the sprinkler to the upright water conducting pipe (not shown) by which the sprinkler is supported at a suitable elevation above the ground. The extension 3 confines a ball-bearing 4 which has its seating on an annular shoulder 5 at the base of said extension and resists the upward thrust of the body A in consequence of the upward pressure of the water admitted to said body through the journal 2. In order that the bearing 4 may act with this effect, it engages a nut or equivalent stop 8 secured upon the upper end of a rod 9 which extends axially through the journal 2, the chamber 1 and the bearing 4. The rod 9 projects at its lower end beyond the journal 2 and its projecting end is non-rotatably associated with a plate 10 which is threaded into the bell-mouth 11 of the sleeve 6. The non-rotatable association of the rod 9 and the plate 10 is preferably established by lateral projections 12 at the lower end of the rod 9 engaging in a groove 13 extending diametrically on the under side of said plate. At the junction of the body of the sleeve 6 and its bell-mouth 11 an internal annular shoulder 14 is provided which is substantially flush with the lower end of the journal 2; and the annular space between the sleeve 6 and the journal 2 is normally closed by a flexible washer 15 which acts in analogy to a valve and has a width equal to the combined width of the shoulder 14 and the lower end of the journal 2, said washer being fitted against said shoulder and lower end of said journal. The plate 10 is provided with a number of openings 16 through which water from the upright supporting pipe may pass into the journal 2. The rod 9 has a flat face 17 which forms an interruption of the threads along its upper portion and prevents rotation of a washer 18 arranged on the nut 8 and between it and a lock nut 19. The bearing housing provided by the extension 3 is normally closed by a cap 20 threaded on said extension.

The above features, broadly considered, are disclosed in my Patent No. 1,165,202 above referred to, although it may be noted that the present disclosure introduces certain specific variations in the construction of the upper bearing for the body A, in the provision of said body with a removable top plate 21 upon which the extension 3 is formed, and in the means for non-rotatably associating the lower end of the rod 9 and the plate 10.

According to the present invention, the nozzle 22 is mounted on a carrier 23 which is connected to the rotating body A for pivotal movement about a horizontal axis transverse to said body. The carrier 23 is most advantageously utilized as a connecting pipe between the chamber 1 and the nozzle 22 and as now considered and preferred is in the form of a generally triangular frame having arms 23$^a$ whose inner ends, located at opposite sides of the cylinder are connected by a cross-tube 23$^b$ extending through said cylinder and journaled in bearings secured in the walls thereof. The outer ends of the arms 23$^a$ are connected by a Y-shaped coupling 23$^c$, from which the nozzle 22 projects along an axis disposed symmetrically with respect to the arms 23$^a$. The bearings for the cross-tube 23$^b$ comprise, in each instance, a thimble 24 threaded into the wall of the chamber 1 and closely surrounding as a journal a bushing 25 secured fast on the tube 23$^b$. The annular space between the thimble 24 and the bushing 25 is sealed within the chamber 1 by a flexible washer 26 which is held in close contact with the substantially co-planar inner end faces of said thimble and bushing by the pressure of an expansive coil spring 27 surrounding the tube 23$^b$ within the chamber 1 and bearing with its ends against metal washers 28, which overlie the washers 26 at opposite sides of said chamber. The thimble 24 and bushing 25 are formed at their outer ends with circumscribing flanges 24$^a$ and 25$^a$, the flange 24$^a$ abutting the outer face of the wall of the chamber 1 and the flange 25$^a$ abutting the flange 24$^a$ and carrying the screw 29 by which the bushing 25 is secured fast to the tube 23$^b$. Within the chamber 1 the tube 23$^b$ has an elongated opening 30 along its under side through which water enters said tube from the chamber 1 and is conducted by the arms 23$^a$ to the nozzle 22 at which it is discharged. It is preferred to arrange a screening plate 31 in front of the opening 30 for the obvious purpose of preventing any particles of sand or foreign matter from being carried over with the water into the nozzle carrier 23. By extending the tube 23$^b$ wholly through the chamber 1 and utilizing the bushings 25 for holding said tube against endwise displacement relative to said chamber, an advantage is secured in that the end thrust of the water at the opposite ends of the tube counter-act one another and, therefore, no special means for compensating for such end thrusts is required.

According to the present invention, the nozzle 22 is slowly oscillated in a vertical plane, and during the oscillation of said nozzle, the distributing chamber is rotated about its central axis coincident with the rod 9, whereby the stream delivered by the nozzle ultimately covers all the ground within a circular area whose radius is measured by the stream of greatest length projected by the nozzle, and further whereby the nozzle will project its stream of greatest length through a distance in excess by several feet of any stream of the greatest length through which a stream could be projected by dependence on the carrying power of water pressure alone. This excess stream length is due to the downward throw of the nozzle as the latter approaches the end of each single oscillatory movement thereof. Another feature of the invention consists in so timing the movement of the nozzle at different periods of its oscillation that the water delivered upon the ground will be greater in quantity in accordance as the areas upon which the delivered water falls are at greater distances from the sprinkler head. For this purpose, during each single oscillatory movement of the nozzle, the speed of such movement will progressively increase from zero at the beginning of the movement to maximum at the middle of the movement and will thereupon progressively decrease from maximum at the middle of the movement to zero at the end of the movement; and on the return movement of the nozzle, these same changes in speed will be effected. Thus, the movements of the nozzle will be slower as the areas to be irrigated are greater and will be quicker as the areas to be irrigated are less, and in this way, greater areas will receive proportionately greater quantities of water while less areas will receive proportionately less quantities of water. Another feature of the invention consists in effecting the rotation of the distributing chamber 1 in a step-by-step manner and in quickly effecting each rotatory step of movement of the chamber 1 during a short interval immediately preceding and succeeding the movement of the nozzle through perpendicular. The principal advantage of this is that the rotatory movements of the chamber 1 are effected at periods when the re-active force of the water acting in opposition to such movements is practically *nil*, and in consequence, the power required for effecting the rotation of the chamber 1 is reduced to a minimum.

For the operation of the sprinkler head in the manner above generally described the construction involves certain correlated gear elements driven from a main shaft 32. The main shaft 32 is preferably vertically disposed and carries at its lower end a water wheel 33. The power for the operation of the shaft 32 is furnished by a relatively small stream of water which is directed against the wheel 33 by a nozzle 34, in turn carried by a pipe 35, which is fixed in the wall of the chamber 1 and projects laterally therefrom. Thus, a portion of the water entering the chamber 1 will be utilized to drive the wheel 33 and thus to drive the gearing by which the operation of the sprinkler head is effected. In order that the stream delivered by the nozzle 34 may be regulated whereby the operation of the head may be accelerated or retarded as desired, a suitable regulating valve 36 is arranged in a connection between the pipe 35 and the nozzle 34.

The gearing for effecting the operation of the sprinkler head, as now considered, is of the following construction: The shaft 32 carries near its upper end a worm 37 in mesh with a worm wheel 38. The worm wheel 38 is employed to effect the oscillation of the nozzle carrier 23 and for this purpose said carrier has at one side thereof an extension 39 depending below its journal tube 23ᵇ and connected by a pitman 40 with the worm wheel 38. The extension 39 carries at its lower end a counter-balance weight 41 whereby the nozzle carrier 23 may be evenly balanced at opposite sides of its axis of rotation, and in consequence, its movements may be rendered uniform and with a minimum expenditure of power. The relation of the pitman 40 to the nozzle carrier 23 and the worm wheel 38 is such that the nozzle carrier will, as above explained, move from zero at the beginning of its oscillatory movement to maximum at the middle of such movement, and thereafter from maximum to zero at the end of such movement. The worm wheel 38 is mounted on a horizontal counter-shaft 42 which forms an element of the gearing for effecting the rotation of the body A. This gearing includes in addition to the shaft 42 a shaft 43 driven from the shaft 42 by miter gears 44 and a worm wheel 45 secured fast on the body A just below the distributing chamber and driven from the shaft 43 by a worm 46. If a steady rotation of the body A is desired, the worm 46 may be of ordinary form; but in order to effect a step-by-step movement of the rotatable body A, the worm 46 is of special construction as best shown in Fig. 6, and by virtue of its special construction, may be termed a " cam worm." For the purpose of effecting a step-by-step rotation of the body A, the worm 46 embodies a single convolution whose ends overlap and for some distance beyond each end thereof it is of straight formation, its straight portions, however, being connected midway of the length of said worm by a relatively short, abrupt and pronounced spiral or cam portion 46ᵃ which, in co-action with the worm wheel 45, is instrumental in effecting a stepwise movement of the body A. The spiral or cam portion 46ᵃ of the worm 46 is so located that the movement of the body A takes place during a relatively short interval immediately preceding and succeeding the movement of the nozzle 22 through perpendicular, at which period the re-active force of the water acting in opposition to the rotation of the body A is practically *nil*. It is contemplated that the worm 46 shall shift the body A during alternate movements of the nozzle carrier 23—in other words, that said worm shall shift the body A once during each complete oscillation (composed of a movement in one direction and the return movement in the other direction) of said nozzle carrier. If desired, however, the worm 46 can be designed to shift the body A during each single movement of the nozzle carrier in either direction. The various gear elements described may be supported in any suitable manner. As shown, a single bracket 47 is secured to the body A and is provided with arms for the support of the several shafts 32, 42 and 43. It will be noticed that the gear elements are all arranged substantially at one side of the body A; and to prevent any unbalancing of said body due to this arrangement, a counter-weight 48 is applied at the opposite side of said body, this counter-weight being supported on a rod 49 which, in turn, is secured in the coupling that connects the pipe 35 and the body of the valve 36.

It will be noticed that the worm wheel 38 is relatively large and that said worm wheel and the worm 37 constitute a speed reducing gearing between the shaft 32 and the nozzle carrier 23. In like manner, the worm 46 and worm wheel 45 constitute a speed reducing gearing between the shaft 42 and the rotatable body A, the shaft 42 deriving its movement from the speed reducing gearing consisting of the worm 37 and the worm wheel 38. In this way, the oscillatory movement of the nozzle carrier 23 is rendered comparatively slow and the intervals of time between the successive steps of movement of the body A are relatively long, while the power required to effect the oscillation of the nozzle carrier 23 and the rotation of the body A is reduced to a minimum. The irrigation of the area within the projecting capacity of the sprinkler head will be most thoroughly effected in three or four complete revolutions of the body A; and even a single complete revolution of said body will effect good irrigation in cases where the ground is not baked or dried out and has substantially its normal content of moisture. The operation of the device, broadly considered, is graphically illustrated in the diagram of Fig. 7 which shows the oscillatory movement of the carrier 23, indicating by dotted lines the relation of streams projected by said carrier in opposite positions thereof, and also the manner in which these projected streams are played at regularly progressing points throughout a circular path in consequence of the rotation of the body A.

The sprinkler head, as above described, is adapted for out-door use. As applied to in-door use, there are usually considerations which render it inexpedient to project the stream in a vertical direction or above a certain elevation. Therefore, as applied to in-door use, the oscillatory movement of the nozzle carrier is eliminated by the simple expedient of disconnecting the pitman 40 from the extension 39 of the nozzle carrier; and the nozzle carrier is supported, as shown in Fig. 8, at a fixed elevation which may be regulated as desired by means of an arm 50, conveniently secured on the rod 49, adjustable as to its length by a turn-buckle or other device, and having at its upper end a suitably formed fork 51 which engages the crotch of the nozzle carrier 23. In other respects, the sprinkler head operates in the manner described, the body A being driven in the same manner through the co-action of the gear elements 37, 38, 42, 44, 43, 46 and 45.

The elimination of the oscillatory movement of the nozzle carrier 23 renders a nozzle of ordinary construction, as employed for out-door use, unsuitable; and a nozzle of special construction must, therefore, be provided. Such a nozzle is shown in Figs. 8, 9 and 10 and has an elongated discharge opening 53 formed along a beveled discharge end 54 and which increases in width from its inner or rearmost to its outer or foremost end. The nozzle is positioned with its opening 53 laterally directed; and by virtue of the increase in width of the nozzle opening 53 from the inner to the outer end thereof and of the arrangement of said opening along a beveled surface, i. e., in a direction oblique to the axis of the nozzle, the stream projected by the nozzle will have a sort of a club or knife-blade shape as viewed in plan, and will progressively increase in width from the nozzle toward its remote end and will also progressively increase in width from its curved or arched edge which adjoins the inner end of the opening 53 toward its straight edge which adjoins the outer end of the opening 53. In this way, the water composing the stream will progressively increase in quantity and also in area from the inner to the outer end of the stream, and it follows that the greater areas to be irrigated will receive proportionately greater amounts of water and less areas to be irrigated will receive proportionately less water.

In case any sand or foreign matter should deposit on the base of the chamber 1, such deposits can be readily blown off from time to time through a normally closed valve-controlled outlet or pet cock 55 which is connected to said chamber at a point close to the base thereof, as best shown in Fig. 4.

I claim—

1. In a sprinkler head, in combination, a rotatably mounted distributing chamber, a nozzle supplied therefrom and mounted for oscillatory movement in a vertical plane athwart said chamber, means for effecting oscillatory movement of said nozzle, and means for effecting step-by-step rotation of said distributing chamber during periods when the nozzle is moving through perpendicular.

2. In a sprinkler head, in combination, a distributing chamber having an upright support adapted for connection to a service pipe, said chamber being rotatable about said support as an axial center, a tubular nozzle carrier arranged externally of said chamber and communicating with the interior thereof, said nozzle carrier being pivotally connected at its lower end to the distributing chamber for oscillatory movement in a vertical plane athwart said chamber and being movable through an angle having a vertical bisector, a rotatable gear wheel arranged externally of said chamber at one side thereof, a water wheel for operating said gear wheel, means for delivering water from said chamber to said water wheel to effect rotation thereof and a link eccentrically connected to said gear wheel and also connected to said nozzle carrier to effect oscillatory movement of said carrier through said angle at a speed which gradually increases from zero at the beginning of the stroke to maximum at the middle of the stroke and which gradually decreases from maximum to zero at the end of the stroke.

3. In a sprinkler head, in combination, a rotatable distributing chamber, a nozzle, a nozzle carrier pivotally connected to the distributing chamber for oscillatory movement in a vertical plane athwart said chamber, a rotatable gear wheel arranged at one side of said chamber, a link eccentrically connected to said gear wheel and also connected to said nozzle carrier to effect oscillatory movement thereof through an angle having a vertical bisector, a gear wheel circumscribing and secured fast to said chamber, a worm having an abrupt spiral cam portion co-acting with said last-named gear wheel to effect a step-by-step rotation of said chamber, and gearing for operating said worm from said first-named gear wheel.

4. In a sprinkler head, in combination, a rotatable distributing chamber, a nozzle, a nozzle carrier pivotally connected to the distributing chamber for oscillatory movement in a vertical plane athwart said chamber, a worm wheel circumscribing and secured fast to said distributing chamber, a worm driving said worm wheel, a rotatable gear wheel supported by said distributing chamber, a connection between said gear wheel and said nozzle carrier for oscillating the latter, and gearing operatively connecting said gear wheel and said worm.

5. In a sprinkler head, in combination, a rotatable distributing chamber, a nozzle, a nozzle carrier pivotally connected to the distributing chamber for oscillatory movement in a vertical plane athwart said chamber and having an extension below its pivot, a rotatable gear element, a link connecting said gear element and said extension to effect oscillatory movement of said nozzle carrier through an angle having a vertical bisector, and a counter-weight carried by said extension.

6. In a sprinkler head, in combination, a rotatable distributing chamber, a nozzle, a tubular nozzle carrier conducting water from said chamber to said nozzle and pivotally connected to said chamber for movement in a vertical plane athwart said chamber, external gearing supported by said chamber at one side thereof for rotating said chamber and oscillating said nozzle carrier, and an external counter-balance supported by said chamber at the side thereof opposite to said gearing.

In testimony whereof I have hereunto set my hand in the presence of two subscribing witnesses.

CHARLES H. PERRY.

Witnesses:
JAMES L. MORRIS,
CHAS. S. HYER.